Figure 1:
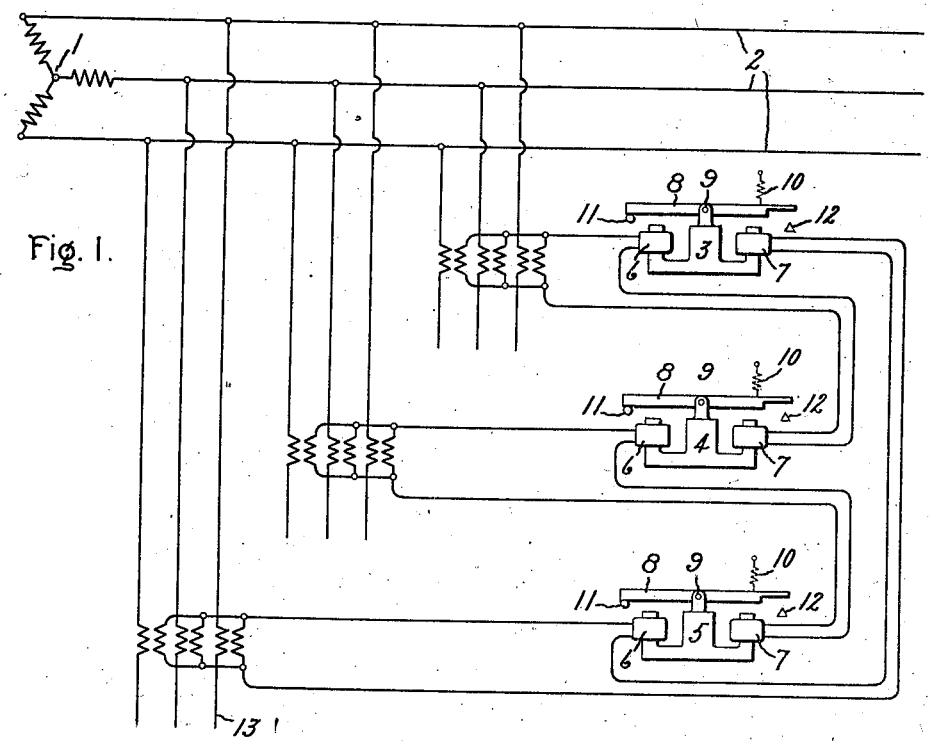

A. DAVIS.
FAULTY CABLE LOCALIZER.
APPLICATION FILED MAY 31, 1912.

1,203,556.

Patented Oct. 31, 1916.

Witnesses:
Helen Oxford
Allan V. Clarke

Inventor
Archibald Davis,
by Albert G. Davis
His Attorney.

UNITED STATES PATENT OFFICE.

ARCHIBALD DAVIS, OF SCHENECTADY, NEW YORK, ASSIGNOR TO GENERAL ELECTRIC COMPANY, A CORPORATION OF NEW YORK.

FAULTY-CABLE LOCALIZER.

1,203,556.  Specification of Letters Patent.  Patented Oct. 31, 1916.

Application filed May 31, 1912. Serial No. 700,667.

*To all whom it may concern:*

Be it known that I, ARCHIBALD DAVIS, a citizen of the United States, residing at Schenectady, county of Schenectady, State of New York, have invented certain new and useful Improvements in Faulty-Cable Localizers, of which the following is a specification.

My invention relates to the localizing of faults developed on transmission lines and to apparatus particularly adapted for this work, although the apparatus I have shown and described is not limited in its applicability to this work alone.

In carrying out my invention of indicating upon which feeder or cable a fault occurs, I use a device which I desire to call a localizer. The localizer consists of a set of interconnected relays, one relay being provided for each feeder or cable. These relays, which I desire to call localizer relays, are of a type of construction consisting of two coils each, the pulls of each coil of the pair being balanced against each other, the only relay operating being the one in which an unbalancing occurs. When, therefore, an unbalancing occurs upon any feeder due to a ground thereon, an unbalancing is also produced in the relay corresponding to this feeder and it is operated to suitably indicate this faulty feeder.

Since there are certain abnormal conditions occurring on transmission lines at various times, which conditions are similar in their action to the disturbances caused by the faults which I desire to locate, but which exist for shorter periods of time, such as momentary surges, I provide a time element device as a part of each localizer relay which delays indication of the abnormal condition until that condition has persisted for a certain definite period of time. Each relay with its time element device forms a unit, one unit being provided for each feeder. By properly adjusting the time element device the localizer will therefore indicate a fault only. There may be other pieces of apparatus also attached to the transmission system, as for example, an arcing ground suppressor, which operate only after a certain period of time, and the actuation of which prevents the actuation of my localizer. The period between the length of time during which an abnormal condition which I do not care to localize, may exist, and the period of time required by the outside apparatus to operate may be very short, and one of the great advantages of my invention lies in the ability of the time element device to differentiate between these two periods. I have found that the time element device of my localizer can be constructed to restrain indication on the occurrence of abnormalities persisting for not more than one-fifth of a second, and still allow operation in less than one-fourth of a second on the occurrence of a fault.

Figure 2:
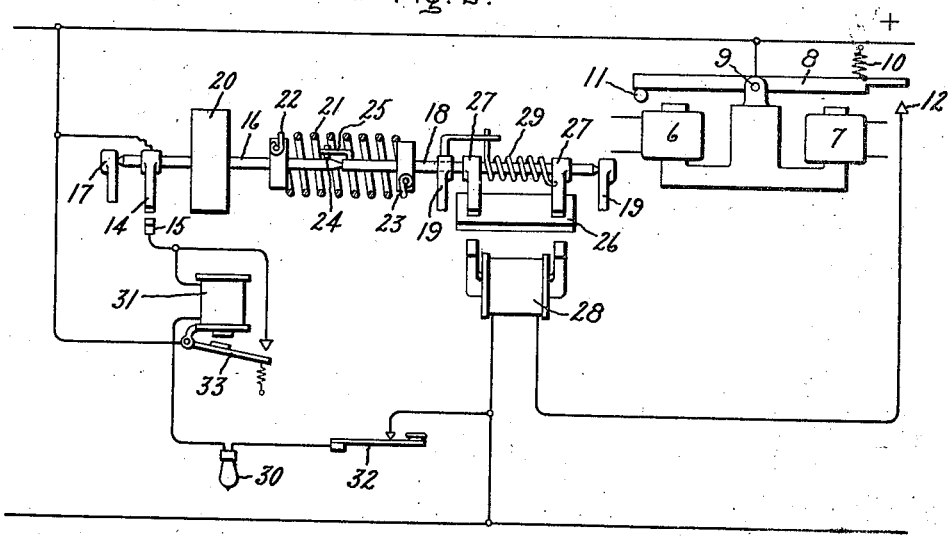
Figure 3:
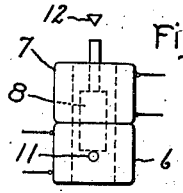

Figure 1 shows diagrammatically a three phase system of distribution including three feeders connected to the same bus bars and connected to a localizer which, however, in this figure are only shown in part; Fig. 2 shows diagrammatically one construction of localizer relay involving my invention and embodying my novel type of time limit relay, and Fig. 3 shows a possible modification of the part of my localizer shown in Fig. 1.

In Fig. 1, the generator 1 is connected to the bus bars 2; to these bus bars are connected three feeders. I have provided a localizer comprising localizer relays, 3, 4, 5, one for each of the feeders shown, which on the occurrence of a fault on any one of the three feeders indicates the feeder on which the fault occurs. The part of each localizer relay which I have shown in Fig. 1 comprises a magnetic E-shaped core on the two outer legs of which are mounted coils or solenoids 6 and 7. An armature 8, balanced and pivoted at 9, is subject to the attractions of both solenoids which tend to move it in opposite directions. A spring 10 may be provided to hold the armature against the stop 11, which it is desirable to use, although neither the spring nor the stop are absolutely necessary. I desire that the movement of the armature 8, in response to a stronger attraction of the solenoid 7, should be indicated, but do not care to indicate the supremacy of solenoid 6 over 7. For this purpose, I have provided the contact 12 which coöperates with the armature, as will be apparent from Fig. 2, to complete a circuit for actuating the indicator. Since it is not necessary for the armature to respond to the greater attraction of solenoid 6, it is well to use the stop 11 and spring 10 to maintain the armature in such a position that it may be readily actuated on the supremacy of solenoid 7.

By providing a plurality of solenoids for controlling a single armature, the various solenoids may be connected to different feeders and be energized thereby; under normal conditions the armatures of the localizer relays will remain at rest and in such a position that no indication is given, the localizer being designed and constructed with this object in view. On the occurrence of abnormal conditions, however, the feeder, on which the fault has occurred, will energize the solenoid of the localizer relay connected thereto to a different degree than will the other feeders energize their solenoids. There will then be a responsive action on the part of at least one of the armatures to give an indication. In this particular case, I have connected the solenoids to the feeders in such a way that under normal balanced conditions on the feeders, no current will be supplied to the solenoids, and have so arranged the solenoids and armatures of the localizer relays so that one armature and only one will give an indication when the solenoids attached to one feeder are more strongly energized than the other. The connection may be made through three transformers similar to instrument transformers connected as shown, the result being the production of zero electromotive force in each of the connections to the solenoids during such times as the currents through the primaries of each of the groups are balanced, as under the normal operation of the system they will be. The localizer relays are made independent of load current by connection with the current transformers as shown. As long as the current that flows out of one phase of the feeder, at any instant, flows back over either one or both of the other phases, the currents in the current transformer secondaries do the same. Therefore, there is no current in the localizer relay and this condition is true no matter how unbalanced the load current may be. This particular connection may be replaced by others which perform substantially the same functions.

We will first suppose that the feeders are of the same electrostatic capacity. Under this condition the occurrence of a ground on one of the feeders will produce an unbalancing in each group of transformers but there is a greater unbalancing in the group attached to the grounded feeder than in any other, and hence the current supplied to the solenoids attached to the grounded feeder will be greater than the current supplied by any other feeder. Also the unbalancing in and hence the current supplied by the other groups of transformers will be equal. The explanation why this unbalancing takes place in this manner is not simple, due to the many factors involved, but experiment has shown that such unbalancing does occur.

For the purpose of illustration, we may suppose that a ground has occurred at the point 13. The current, therefore, supplied to the solenoids on the localizer relays 3 and 5, which are attached to this feeder, is greater in value than the current supplied to the other solenoids. The currents supplied to the solenoids attached to each of the other feeders are equal in value to each other. The result of this is that the solenoid 7 of the localizer relay 3 and the solenoid 6 of the localizer relay 5 exert more attractive force on their respective armatures than do the opposing coils. The armature 8 of the localizer relay 3 therefore moves into engagement with the contact 12. The armature of the localizer relay 5 does not move on account of its engagement with the stop 11. Should no stop have been provided, the armature then moves downward on the left-hand side without actuating the indicating device, since the armature does not come into engagement with the contact 12. As for the armature 8 of the localizer relay 4, it remains in its balanced position shown in the drawing, since the attractive forces of the solenoids 6 and 7 are equal. The ground 13 will, therefore, operate the localizer and produce an indication upon which feeder the fault has occurred by means of its localizer relay 3. It will be noticed that there is a localizer relay for each feeder the armature of which will respond to a ground on its feeder while the other armatures of the other localizer relays are held in their balanced position, or at least away from their contact 12. This is due to the fact that taking the localizer relays in order, the solenoid 6 of the first localizer relay is in series with the solenoid 7 of the second relay and attached to one feeder, the solenoid 6 of the second relay is in series with the solenoid 7 of the third localizer relay and attached to another feeder, this system of connections continuing until the last localizer relay is reached when the solenoid 6 of that relay is connected in series with the solenoid 7 of the first localizer relay and to the last feeder. I have shown, for purposes of illustration, the application of my localizer to a distribution system comprising three feeders but it is understood that by adding a relay for each feeder that my localizer is applicable to a system comprising any number of feeders.

In Fig. 3, I have shown a modification of that portion of the localizer relay shown in Fig. 1. In this modification, the solenoid 7 is located above the solenoid 6, the armature 8 being placed within the solenoids as indicated in dotted lines. This armature 8 may be prevented from moving downward either under the influence of gravity, or through the attraction of the solenoid 6 by means of the stop 11. Whenever the solenoid 7 is more strongly energized than the solenoid 6, the armature 8 will move upward away from the stop 11 and into engagement with the contact 12.

Seldom, if ever, are all the feeders of the same electrostatic capacity. The amount of current supplied by each group of transformers on the occurrence of a ground elsewhere than on the feeder to which that group of transformers is connected is proportional to the electrostatic capacity of that feeder. Therefore, should an armature be under the control of a solenoid 6 attached to a feeder of small electrostatic capacity and a solenoid 7 attached to a feeder of large electrostatic capacity, and should a fault occur elsewhere on the system than on either of those feeders, nevertheless the solenoid 7 would predominate and produce an actuation of the armature 8. This difficulty may be overcome in various ways, as by properly proportioning the windings of the transformers, variously locating the armatures and coils relatively, and otherwise. I prefer, however, to make the numbers of turns on the various solenoids inversely proportional to the electrostatic capacities of the feeders to which they are attached. Thus the solenoids attached to a feeder of small electrostatic capacity will have more turns than the solenoids attached to a feeder of a greater electrostatic capacity. When such provisions are made, the occurrence of a fault elsewhere than on the feeders will produce equal attractive forces on the armatures. Stated otherwise, equal abnormalities in the various feeders will produce attractive force by the various solenoids inversely proportional to the electrostatic capacity of the feeders to which the solenoids are respectively connected.

As has been before noted, it is desirable to make a localizer relay which will give an indication of an abnormality only after the continuance of that abnormality for a certain definite period of time, and also to produce the actuation of such indicator within a given period of time. Obviously the localizer should be able to work within very narrow limits. I have produced a localizer which in its complete form includes a time element device capable of the fine adjustment necessary, and although I have termed the complete device a localizer relay, it will be understood from the description that neither the complete device nor any component part is limited in its applicability to the particular application which I have made. I propose to depend upon inertia to determine the period which must elapse between the occurrence of a condition and the actuation of the indicator. I propose to provide an indicating mechanism with substantial inertia and to provide a device tending to actuate the indicator with a substantially constant force. If then the condition for allowing the actuating of the indicator continues for a certain period of time, the inertia of the indicator will be overcome by its moving device and the indication given. Should, however, the condition have changed within that period, the further actuation of the indicator will be prevented, and the whole returned to its original position, if desired.

The indicator may be the arm 14, but I have shown in this case this arm completing a circuit through the lamp 30 which thus becomes the indicator proper; this circuit is completed when the arm 14 is brought into engagement with the contact 15. It should be understood that by the term "indicator" I do not intend to limit my invention to a visual or audible indicator but that I use the term broadly and that it may include means for actuating switches or other devices as desired. The arm 14 is mounted on the rotatable member or shaft 16, one end of which is carried by the bearing 17, and the other end of which is carried in a bearing in the end of the rotatable member or shaft 18. The shaft 18 is supported by the bearing 19. Upon the shaft 16, I have mounted a fly wheel 20 of a size and weight to give the desired inertia to the system. I have provided a spring 21 having one end 22 attached to the shaft 16. This spring may be put under tension, and its other end may be fixed as desired, but I prefer to attach the other end 23 to the shaft 18 as shown. The spring 21 normally tends to rotate the shaft 16 and thereby the indicator arm 14 and fly wheel 20. Such rotation is normally prevented by the abutments 24 and 25, one of which is attached to the shaft 16, the other of which stands in its path until moved therefrom on the occurrence of the condition which it is desired to indicate. When the abutment 25 is suddenly removed from the path of the abutment 24, the shaft 16 is turned by the spring 21 and the indicator arm 14 moved thereby. To move the arm 14 a certain definite distance, however, requires a certain period of time, due to the fact that the inertia of the fly wheel and the whole system must be overcome by the moving device, the spring 21. If, therefore, the abutment 25 is removed from the path of the abutment 24 and kept from said path for the given period of time or longer, the indicator arm 14 will be moved to the proper extent to give an indication. If on the other hand, the abutment 25 is returned to the path of the abutment 24 before the elapse of this time, a further actuation of the indicator arm 14 will be stopped. In the particular construction I have shown, the abutment 25 is mounted on the shaft 18 which is controlled by the armature 26 connected by the arms 27 to that shaft. When the solenoid 28 is energized by the completion of the circuit therethrough, as by the engagement of the armature 8 with the contact 12, the armature 26 is attracted and the shaft 18 rotated thereby. The movement of the armature 26 is sufficient to remove the abutment 25 to such an extent that the shaft 16 is allowed to rotate to move the indicating arm 14 to the indicating position. However, should the armature 26 be released by the deenergization of the magnet 28 by the breaking of the circuit at the contact 12, the abutment 25 will be brought back into the path of the abutment 24 and the shafts 16 and 18 and the parts attached thereto will be returned to the original position shown in the drawing by the spring 29. The spring 29 is intended to be strong enough to return all parts to their original positions from any point of their travel substantially instantaneously, irrespective of the inertia of the fly wheel 20 and the rest of the system. As before mentioned, I have constructed such a device as this which would operate the indicating arm 14 to its indicating position, whenever the armature 8 was held in engagement with the contact 12 for a period longer than one-fifth of a second, the indicating arm 14 moving to this position within one-fourth of a second. The device so constructed is reliable in its operations and capable of repeating this performance within the given period of time an indefinite number of times.

In order to make the indicating arm 14 reveal its actuation by means of the lamp 30 and to continue the illumination on the retreat of the indicating arm 14 from the contact 15, I have provided the apparatus and connections shown. Thus as the arm 14 engages with the contact 15, a circuit is completed through the electromagnet 31, the lamp 30 and the switch 32. The energization of the electromagnet now causes the attraction of the armature 33 which completes another circuit through the armature 33, electromagnet 31, lamp 30 and switch 32. When the arm 14 leaves the contact 15, the light is not extinguished, but will be continued until the circuit through the armature 33 is broken, as may be done manually at the switch 32.

It will, of course, be understood that a number of the features shown and described are optional, and that the form and operation of others may be changed without substantially departing from the invention herein disclosed.

What I claim as new and desire to secure by Letters Patent of the United States, is,—

1. The combination with a system of distribution including a plurality of feeders, of an armature, a plurality of solenoids for controlling the armature connected to a plurality of feeders, the solenoids being so connected as to receive no current under normal operating conditions, contacts closed by the movement of said armature in one direction, and a stop for normally preventing the movement of said armature in the opposite direction.

2. The combination with a system of distribution including a plurality of feeders, of means for exerting stresses connected to and receiving energy from a plurality of feeders, an armature controlled by said means, contacts closed by the movement of said armature in one direction, and a stop for normally preventing the movement of said armature in the opposite direction.

3. The combination with a system of distribution including a plurality of feeders, of transformers connected thereto, a balanced armature, two solenoids tending to move the armature in different directions connected to the transformers on a plurality of feeders, the windings of the transformers being so related and connected to supply no current to the solenoids under normal operating conditions, and a stop for normally preventing the movement of said armature except in one direction.

4. The combination with a system of distribution including a plurality of feeders, of means for exerting stresses connected to and receiving energy from a plurality of feeders, an armature controlled by said means, said means being so constructed and related to the armature as to produce stresses thereon when similarly energized, inversely proportional to the electrostatic capacity of the feeders to which they are attached, and a stop limiting movement of the armature in one direction.

5. The combination with a system of distribution including a plurality of feeders, of means for exerting stresses connected to and receiving energy from a plurality of feeders, a balanced armature, two of said means receiving energy from different feeders being located adjacent the armature and tending to move it in different directions, said means being so constructed and related to the armature as to produce stresses thereon when similarly energized, inversely proportional to the electrostatic capacity of the feeders to which they are attached.

6. The combination with a system of distribution including a plurality of feeders, of an armature, solenoids tending to move the armature in different directions connected to and receiving energy from the feeders, the number of turns on the solenoids being such that under equal energization the various solenoids produce stresses on the armature inversely proportional to the electrostatic capacity of the feeders to which they are attached, and means to limit the movement of the armature in one direction.

7. The combination with a system of distribution including a plurality of feeders, of a balanced armature, two solenoids tending to move the armature in different directions connected to and receiving energy from a plurality of feeders, the number of turns on the solenoids being such that under equal energization the solenoids produce stresses on the armature substantially inversely proportional to the electrostatic capacity of the feeders to which they are attached.

8. The combination with a system of distribution including a plurality of feeders, of an armature for each feeder, means to limit movement of each armature in one direction, a solenoid tending to move each armature in that direction, a second solenoid tending to move each armature in the opposite direction, and connections between the solenoids and the feeders so arranged that the first solenoid of one armature and the second solenoid of another armature is connected to each feeder.

9. The combination with a system of distribution including a plurality of feeders, of an armature for each feeder, means to limit movement of each armature in one direction, a solenoid tending to move each armature in that direction, a second solenoid tending to move each armature in the opposite direction, transformers connected to each feeder, and connections between the solenoids and transformers so arranged that each feeder is connected to one solenoid of one armature and the second solenoid of another armature.

10. The combination with a system of distribution including a plurality of feeders, of an armature for each feeder, means to limit movement of each armature in one direction, a solenoid tending to move each armature in that direction, a second solenoid tending to move each armature in the opposite direction, and connections between the solenoids and the feeders so arranged that the first solenoid of one armature and the second solenoid of another armature is connected to each feeder, the solenoids operating on each armature being so constructed and arranged relatively to the armature and so connected to the feeders as to produce no movement of the armature away from the stop on the occurrence of a fault on the system elsewhere than on the feeder to which the second solenoid is connected.

11. The combination with a system of distribution including a plurality of feeders, of an armature for each feeder, means to limit movement of each armature in one direction, a solenoid tending to move each armature in that direction, a second solenoid tending to move each armature in the opposite direction, and connections between the solenoids and the feeders so arranged that the first solenoid of one armature and the second solenoid of another armature is connected to each feeder, the solenoids operating on each armature being so constructed and arranged relatively to the armature as to produce stresses thereon under equal energization substantially inversely proportional to the electrostatic capacity of the feeders to which they are connected.

12. The combination with a system of distribution including a plurality of feeders, of an armature for each feeder, means to limit movement of each armature in one direction, a solenoid tending to move each armature in that direction, a second solenoid tending to move each armature in the opposite direction, and connections between the solenoids and the feeders so arranged that the first solenoid of one armature and the second solenoid of another armature is connected to each feeder, the numbers of turns on the solenoids operating on each armature being substantially inversely proportional to the electrostatic capacity of the feeders to which they are connected.

13. The combination with a system of distribution including a plurality of feeders, of means for selectively indicating a ground on any of said feeders comprising a plurality of interconnected relays one relay for each feeder, an armature for each relay, two solenoids tending to actuate each armature in different directions, and means including a time limit element actuated by the movement of each armature in one direction.

14. The combination with a system of distribution including a plurality of feeders, of means for selectively indicating a ground on any of said feeders comprising a plurality of interconnected relays one for each feeder, an armature for each relay, two solenoids tending to actuate each armature substantially instantaneously in different directions, and means including a time limit element actuated by the movement of each armature in one direction.

15. In combination with a system of distribution including a plurality of feeders, of a localizer comprising a plurality of interconnected relays one relay corresponding to each feeder, two coils for each relay, a circuit corresponding to each feeder including one coil of the relay corresponding to that feeder and one coil of another of said relays, and means for supplying to each circuit a resultant current from its corresponding feeder.

16. In combination with a system of distribution including a plurality of feeders, a localizer for selectively indicating the occurrence of a fault upon any of said feeders comprising interconnected relays one corresponding to each feeder, two solenoids for each relay, a circuit corresponding to each feeder and including two solenoids of different relays, means for supplying to each circuit a resultant current from its respective feeder, an armature for each relay, external circuits closed by the movement of each armature, means for indicating the closure of each circuit, and means for introducing a time interval between the closing of each circuit and the operation of its indicating means.

17. In combination with a system of distribution including a plurality of feeders, a localizer for indicating any feeder at fault comprising interconnected relays one corresponding to each feeder, two solenoids for each relay, a circuit corresponding to each feeder and including two solenoids of different relays, means for supplying to each circuit a resultant current from its respective feeder, an armature for each relay, external circuits closed by the movement of each armature in one direction, a second relay actuated in response to the closing of each of said circuits, contacts closed by each of said second relays, and means for introducing a time interval between the closing of said contacts and the operation of said second relays.

18. In combination with a system of distribution including a plurality of feeders, a localizer comprising interconnected relays one corresponding to each feeder, two solenoids for each relay, a circuit for each feeder including one solenoid of the relay corresponding to that feeder and a solenoid of another of said relays, current transformers in each of said feeders for supplying to the circuits corresponding to each feeder a current proportional to the algebraic sum of the currents of each feeder, an armature for each relay, contacts closed by the movement of each armature in response to the action of one of its solenoids, and a stop for preventing the armature from responding to the action of its other solenoid.

19. The combination with a system of distribution including a plurality of feeders, of differential relays one for each feeder, armatures for said relays, two solenoids controlling each armature, a plurality of circuits each including one solenoid of one relay and one solenoid of another relay, means for supplying to each of said circuits a resultant current from each feeder, contacts closed by the movement of each armature in one direction, and means for preventing the movement of each armature in the opposite direction.

20. A localizer for a plurality of feeders comprising a plurality of relays one for each feeder, two solenoids for each relay, a plurality of circuits one corresponding to each feeder including one solenoid from one relay and one solenoid of another relay, current transformers in each feeder for supplying to said circuits the resultant current from their respective feeder, an armature for each relay movable in one direction in response to one solenoid and in the other direction in response to the other solenoid, and means for preventing each armature from moving except in one direction.

21. A localizer for a plurality of feeders comprising a plurality of relays one for each feeder, two solenoids for each relay, a plurality of closed circuits one corresponding to each feeder and each including a solenoid from one relay and a solenoid from another relay in series, means for supplying to said circuit the resultant current from their respective feeders, an armature for each relay movable in opposite directions in response to each of its solenoids, and contacts closed by each armature when moved in one direction.

22. The combination with a system of distribution comprising three or more feeders, of means for selectively indicating a ground on any of said feeders comprising a relay corresponding to each feeder, a winding for each relay receiving the resultant current of its respective feeder, a second winding for each relay receiving the resultant current of another feeder, and a member differentially movable in response to said windings.

23. The combination with a system of distribution comprising a plurality of feeders, means operative in response to a ground on any of said feeders to selectively indicate the feeder at fault comprising a differential relay corresponding to each feeder, windings on said relay receiving the resultant current from two different feeders, said windings being so arranged that their number of turns are inversely proportional to the electrostatic capacity of their respective feeders.

In witness whereof, I have hereunto set my hand this 27 day of May, 1912.

ARCHIBALD DAVIS.

Witnesses:
  C. P. COLES,
  A. W. LATTA.